United States Patent
Goetz et al.

(10) Patent No.: US 7,699,381 B2
(45) Date of Patent: Apr. 20, 2010

(54) WINDBREAK DEVICE

(75) Inventors: Matthias Goetz, Markgroeningen (DE); Joerg Riehle, Asperg (DE); Jens Eisenschmidt, Pforzheim (DE); Bernhard Rimmelspacher, Rheinstetten (DE)

(73) Assignee: Scambia Industrial Developments Aktiengesellschaft, Schaan (LI)

( * ) Notice: Subject to any disclaimer, the term of this patent is extended or adjusted under 35 U.S.C. 154(b) by 0 days.

(21) Appl. No.: 11/899,619

(22) Filed: Sep. 5, 2007

(65) Prior Publication Data

US 2008/0061599 A1 Mar. 13, 2008

(30) Foreign Application Priority Data

Sep. 7, 2006 (DE) .................. 10 2006 043 004

(51) Int. Cl.
*B62D 35/00* (2006.01)
(52) U.S. Cl. .................... 296/180.1; 296/180.5; 296/85
(58) Field of Classification Search ............... 296/85, 296/180.1, 180.5; B62D 35/00
See application file for complete search history.

(56) References Cited

U.S. PATENT DOCUMENTS

| | | | | |
|---|---|---|---|---|
| 5,687,453 | A * | 11/1997 | Megregian et al. ............ | 16/221 |
| 6,866,394 | B1 * | 3/2005 | Hutchins et al. ............ | 362/192 |
| 7,533,920 | B2 * | 5/2009 | Ohly .......................... | 296/53 |
| 2007/0040413 | A1 | 2/2007 | Rimmelspacher et al. | |
| 2008/0067834 | A1 * | 3/2008 | Erb et al. ................. | 296/180.1 |

FOREIGN PATENT DOCUMENTS

| | | |
|---|---|---|
| DE | 43 38 102 | 5/1995 |
| DE | 44 05 707 | 8/1995 |
| DE | 296 15 342 | 10/1996 |
| DE | 197 35 158 | 1/1999 |
| DE | 199 10 060 | 9/2000 |
| DE | 103 20 108 | 12/2004 |
| EP | 0 361 624 | 4/1990 |
| EP | 1 621 386 | 2/2006 |

OTHER PUBLICATIONS

Baumann et.al—DE 4338102 English translation.*

* cited by examiner

*Primary Examiner*—Patricia L Engle
*Assistant Examiner*—Pinel E Romain
(74) *Attorney, Agent, or Firm*—Lipsitz & McAllister, LLC

(57) ABSTRACT

In order to improve a windbreak device for motor vehicles, in particular for cabriolet vehicles, comprising a windbreak base which can be mounted such that it is fixed to the vehicle and on which a wind deflector which extends in a wind deflector surface can be mounted so as to move between an active position and an inactive position, and a drive device for moving the wind deflector between the inactive and the active position and vice versa, in such a way that the said windbreak device can be operated in as optimum a manner as possible, it is proposed that the drive device can be supplied with power from an on-board electrical system of the motor vehicle by means of a power transmission device, and that the power transmission device comprises a first element which is disposed on the windbreak base, and a second element which is disposed on a side wall of the body of the motor vehicle, the said elements transferring power from the on-board electrical system of the motor vehicle to the drive device which is disposed on the windbreak base when the windbreak device is mounted on the motor vehicle in a functional position.

24 Claims, 9 Drawing Sheets

WINDBREAK DEVICE

This patent application claims the benefit of German Application No. 10 2006 043 004.2, filed Sep. 7, 2006, the teachings and disclosure of which are hereby incorporated in their entirety by reference thereto.

BACKGROUND OF THE INVENTION

The invention relates to a windbreak device for motor vehicles, in particular for cabriolet vehicles, comprising a windbreak base which can be mounted such that it is fixed to the vehicle and on which a wind deflector which extends in a wind deflector area can be mounted so as to move between an active position and an inactive position, and a drive device for moving the wind deflector between the inactive and the active position and vice versa.

Windbreak devices of this type are known, for example, from DE 296 15 342 U1, electrical power from the on-board electrical system of the motor vehicle being supplied via a cigarette lighter.

It is therefore an object of the invention to improve a windbreak device of this generic type in such a way that it is possible to operate the said windbreak device in as optimum a manner as possible.

SUMMARY OF THE INVENTION

According to the invention, this object is achieved in the case of a windbreak device of the type described in the introduction in that the drive device can be supplied with power from an on-board electrical system of the motor vehicle by means of a power transmission device, and in that the power transmission device comprises a first element which is disposed on the windbreak base, and a second element which is disposed on a side wall of the body of the motor vehicle, the said elements transferring power from the on-board electrical system of the motor vehicle to the drive device which is disposed on the windbreak base when the windbreak device is mounted on the motor vehicle in a functional position.

The advantage of the solution according to the invention can be seen in that the power transmission device according to the invention is always able to transmit power when the windbreak device is mounted on the motor vehicle in a functional position, since in the functional position of the windbreak device the first element of the power transmission device and the second element of the power transmission device are necessarily positioned in such a way that they are able to transmit power from the on-board electrical system of the vehicle body to the windbreak base.

In principle, it would be feasible to form the first element of the power transmission device and the second element of the power transmission device as separate elements which are disposed on the vehicle body on one hand and on the windbreak base on the other.

It is particularly expedient when the first element is disposed such that it is integrated in the windbreak base, since a visual design of the windbreak base is then possible in which the presence of the first element of the power transmission device is completely unnoticed.

It is even more advantageous when the second element is disposed such that it is integrated in a side wall of the vehicle body, since the second element of the power transmission device can therefore also be disposed in the body of the motor vehicle such that it is entirely inconspicuous and optimum in terms of design.

In this case, it is particularly expedient when the second element is integrated in an inner lining of the side wall of the vehicle body.

Since the windbreak device has to be mechanically fixed by connecting the windbreak base to the body of the vehicle, provision is preferably made for the first element and the second element to be integrated in a fixing device for securing the windbreak base to the vehicle body. In this case, the power transmission device according to the invention can be realized in a simple manner and such that it is visually entirely inconspicuous.

No further information has been given in conjunction with the previous explanation of the individual exemplary embodiments with regard to the transmission of power for the windbreak device according to the invention.

A first exemplary embodiment therefore provides for the first and the second elements of the power transmission device to transmit electrical power via touching electrical contact areas.

Power transmission of this type, which takes place via touching electrical contact areas, is a solution which can be realized in a highly cost-effective manner.

In this case, it is particularly expedient when the first and the second elements are in the form of plug contact elements, that is to say when one of the elements forms a plug and the other of the elements forms a plug receptacle.

As an alternative to providing touching electrical contact areas for power transmission, a further advantageous exemplary embodiment provides for the first and the second elements of the power transmission device to transmit electrical power in a contact-free fashion.

In the simplest case, contact-free transmission of electrical power of this type is performed via electromagnetic induction.

A solution of this type has the great advantage that no electrical contacts are therefore required between the elements of the power transmission device and it is therefore only necessary for the two elements of the power transmission device to be disposed in a suitable position in relation to one another in order to transmit the electrical power from the on-board electrical system for the vehicle body to the windbreak base.

It is possible within the scope of the solution according to the invention to control the movements of the wind deflector using a control means which is provided in the motor vehicle and can switch on and switch off or else reverse the polarity of the power supply to the drive device. However, it is not possible to detect the respective position of the wind deflector by this means.

Furthermore, the object which is mentioned in the introduction is achieved alternatively or in addition to the solutions described up to this point according to the invention in that the drive device has an associated control unit which actuates the drive device to move the wind deflector between the inactive and the active position and vice versa.

The provision of a control unit of this type has the advantage that control intelligence can be moved to the windbreak device as a result and positions of the wind deflector in relation to the windbreak base, that is to say inclination positions of the wind deflector in relation to the windbreak base for example, can therefore be checked, for example in the windbreak base, and consequently movements of the wind deflector can then be subjected to further control in accordance with the existing inclination positions.

A control unit of this type could, for example, be formed such that it has its own portable operator control elements which are, for example, provided on the windbreak device or interact with the control unit, so that the individual functions of the wind deflector, in particular the movement of the wind deflector between the active position and the inactive position, can be controlled by operating these operator control elements.

In order to improve operator convenience of the windbreak device according to the invention even further, provision is preferably made for the control unit to communicate with a function control means on the vehicle.

In this case, a function control means on the vehicle is to be understood to be control units of the cabriolet vehicle which detect and/or display and/or control individual functions of the motor vehicle.

For example, a control unit for controlling displays on the dashboard, a control unit for detecting function keys on the dashboard, a control unit for detecting and controlling window positions and/or a control unit for controlling a top are included under the term "function control means on the vehicle".

In order to be able to implement communication between the control unit in the windbreak base and the function control means in a simple manner, a signal transmission unit is preferably provided which comprises a first transmission element which is disposed on the windbreak base, and a second transmission element which is disposed on a side wall of the vehicle body.

These transmission elements can, in principle, be provided as separate transmission elements.

In order to be able to optimize a design of a windbreak device, provision is preferably made for the first transmission element to be integrated into the windbreak base.

The design of the bodywork of the motor vehicle can furthermore be optimized when the second transmission element is integrated in the side wall of the vehicle body, in particular when the second transmission element is integrated into an inner lining of the side wall of the vehicle body.

No further information has been given with regard to the type of interaction between the transmission elements up to this point. A first solution which is easy to realize in terms of design thus provides for the transmission elements to interact with one another via touching electrical contact areas.

In this case, it would be feasible, for example, to form the transmission elements as plug contact elements, so that one of the said transmission elements is integrated as a plug and the other of the said transmission elements is integrated as a plug receptacle.

In this case, the transmission elements could be realized in a manner which is particularly advantageous in terms of design when the transmission elements are integrated in a fixing device for securing the windbreak base to the vehicle body.

As an alternative to providing touching electrical contact areas, a further solution provides for the transmission elements to interact with one another in a contact-free fashion.

Contact-free interaction of this type can be realized, for example, by the transmission elements interacting with one another in an inductive fashion.

An alternative to inductive interaction provides for the transmission elements to interact with one another in an optical fashion.

When a control unit is provided in the windbreak device, it is feasible—as already described—to provide operator control elements directly on the windbreak base or the wind deflector.

As an alternative or in addition to the above-described solutions for operation of the control unit, a further solution according to the invention provides for the control unit to communicate with a portable manual operator control means.

In this case, the manual operator control means and the control unit could be connected to one another via a line. However, it is particularly advantageous when the manual operator control means and the control unit communicate with one another in a contact-free fashion.

As an alternative to direct contact-free interaction between the control unit and the manual operator control means, a further solution provides for the control unit to communicate with the manual operator control means via the function control means on the vehicle, it being possible for the function control means on the vehicle to be in the form of, for example, a function control unit for a vehicle locking system.

In this case, it is particularly advantageous when the function control means communicates with the portable manual operator control means in a contact-free fashion.

No further information has been provided with regard to the individual functions, in particular the correlation of the position of the wind deflector with individual functions of the motor vehicle, up to this point.

An advantageous solution therefore provides for the function control means to initiate movement of the wind deflector from the inactive position to the active position via the control unit when the motor vehicle exceeds a predefinable speed.

As an alternative or in addition to this, a further advantageous embodiment provides for the function control means to initiate movement of the wind deflector from the inactive position to the active position via the control unit when a top of the motor vehicle is opened.

As an alternative or in addition, a further embodiment provides for the function control means to initiate movement of the wind deflector from the active to the inactive position via the control unit when a reverse gear is engaged.

As an alternative or in addition to the previous functions, an embodiment further provides for the function control means to initiate movement of the wind deflector from the inactive position to the active position via the control unit when all the windows of the motor vehicle are raised.

Finally, as an alternative or in addition to the previous solutions, one embodiment provides for the function control means to initiate movement of the wind deflector between an inactive position and an active position or vice versa via the control unit when a corresponding operator control key in the vehicle is operated.

The abovementioned function modes of the function control means can be firmly predefined.

However, a solution in which the individual function modes—individually or in groups or in their entirety—can be activated and deactivated is particularly expedient.

The object which is mentioned in the introduction is achieved not only by a windbreak device of the type described up to this point in accordance with the individual embodiments, but also by a cabriolet vehicle which is provided with one or more embodiments of the above-described windbreak device.

Further features and advantages of the invention form the subject matter of the following description and of the illustration in the drawing of a number of exemplary embodiments.

DETAILED DESCRIPTION OF THE INVENTION

Figure 1:
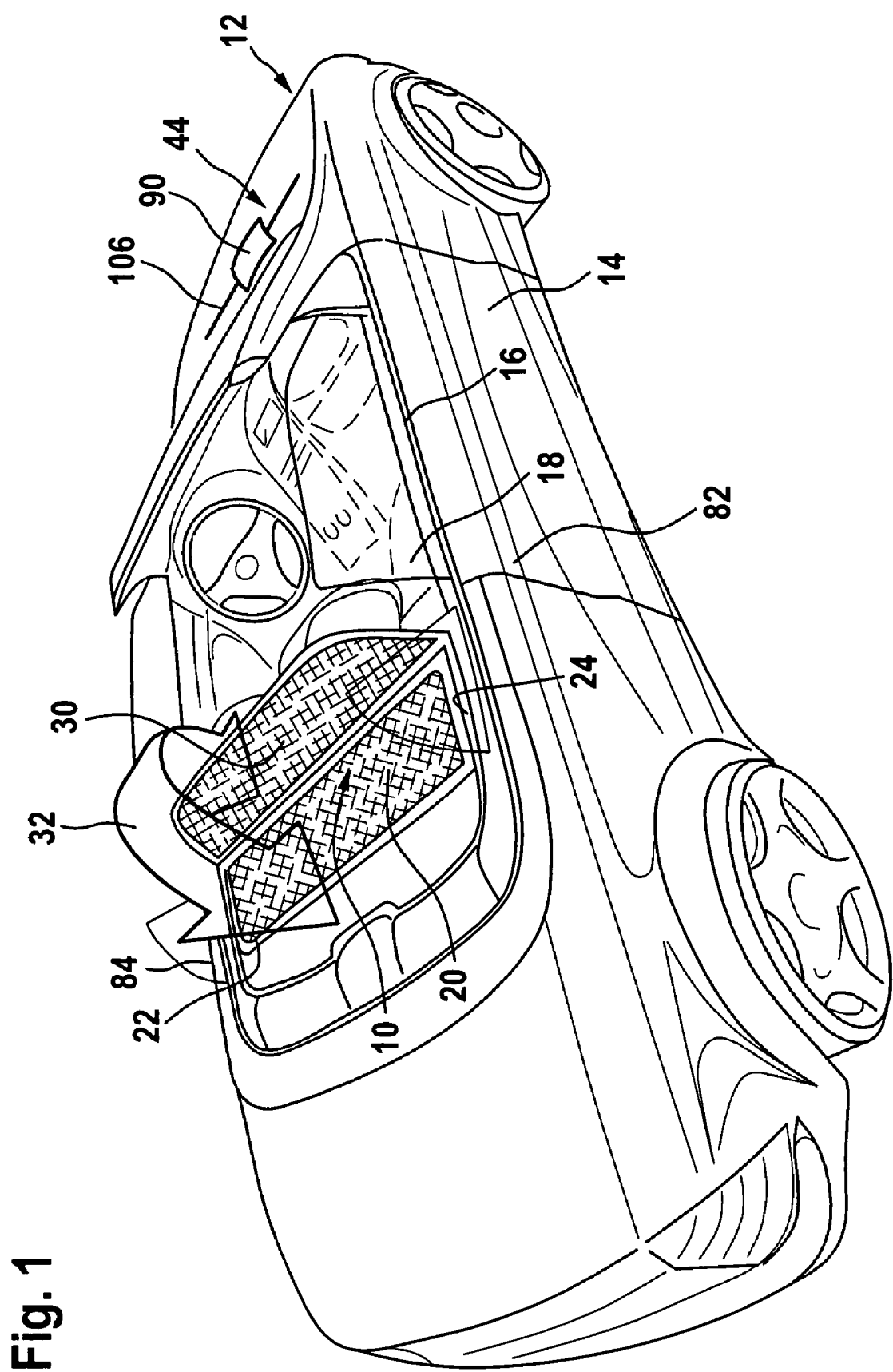
FIG. 1 shows a perspective illustration of a first exemplary embodiment of a windbreak device according to the invention mounted on a motor vehicle, a wind deflector of the windbreak device being in its active position.

A first exemplary embodiment of a windbreak device 10 according to the invention mounted on bodywork 14 of a cabriolet vehicle 12, to be precise behind a front row 18 of seats, comprises a windbreak base 20 which serves as a cover 22 for an open region 24 of the vehicle body 14 which is situated behind the front row 18 of seats. A wind deflector which is denoted 30 overall and can move, as indicated by arrow 32, relative to the windbreak base 20 between an active position, which extends transverse to a beltline 16 of the vehicle bodywork, and an inactive position, which extends approximately parallel to the beltline 16, is mounted on the windbreak base 20 (FIG. 1).

Figure 2:
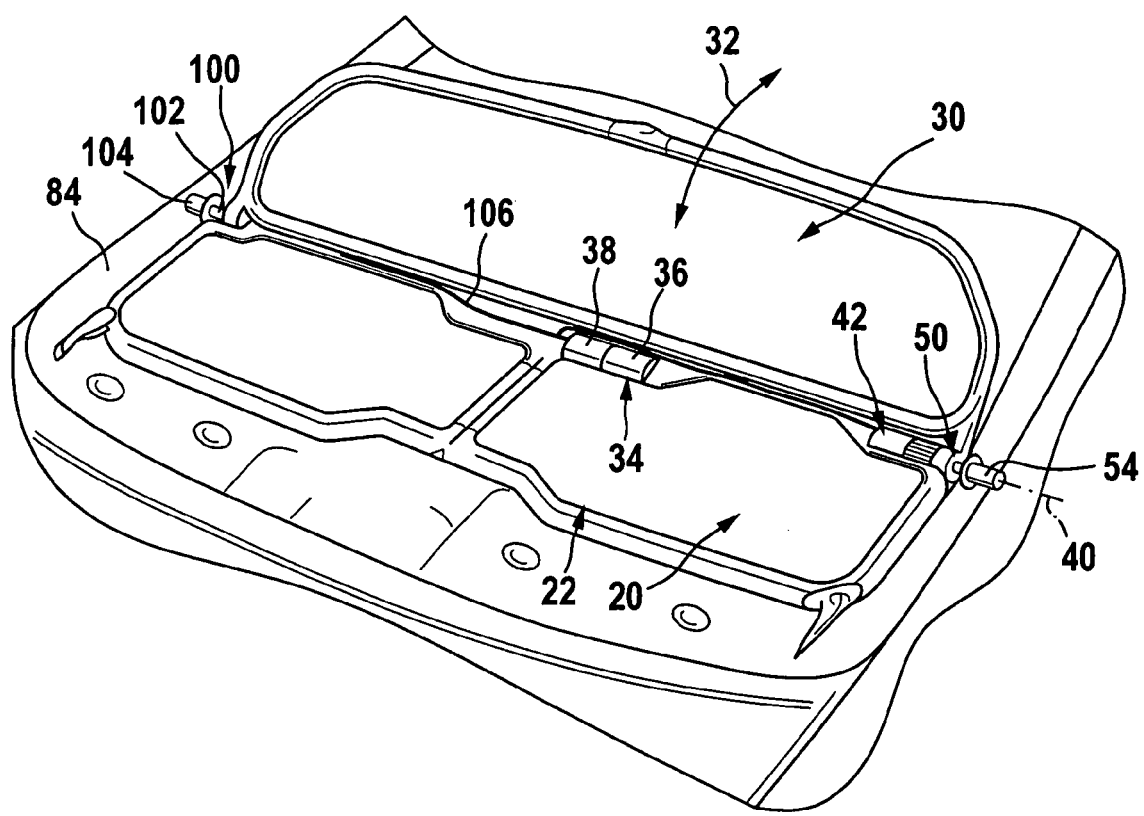
FIG. 2 shows a detail perspective illustration of the windbreak device on the cabriolet vehicle according to FIG. 1.

In order to move the wind deflector 30 in direction 32, the windbreaker base 20 is provided with a drive device which is denoted 34 overall and preferably comprises a drive motor, in particular an electric motor 36, and a gear mechanism 38, by which the wind deflector 30 can be driven in order to execute a pivoting movement about an axis 40 (FIG. 2).

A control unit 42 is also associated with the drive device 34, which unit firstly identifies a pivoted position of the wind deflector 30 and secondly actuates the drive device 34 in accordance with a desired position of the wind deflector 30 which is predefined to the control unit 42.

In order to be able to supply power, in particular power from an on-board electrical system 44 of the motor vehicle 12, to the drive device 34 which is disposed on the windbreak base 20 and to the control unit 42, a power transmission device 50 is provided which comprises a first element 52 which is disposed on the windbreak base 20, and a second element 54 which is disposed on the vehicle body 14, the said elements permitting power to be supplied in the case of the first exemplary embodiment by means of electrical contacts which touch one another.

Figure 3:
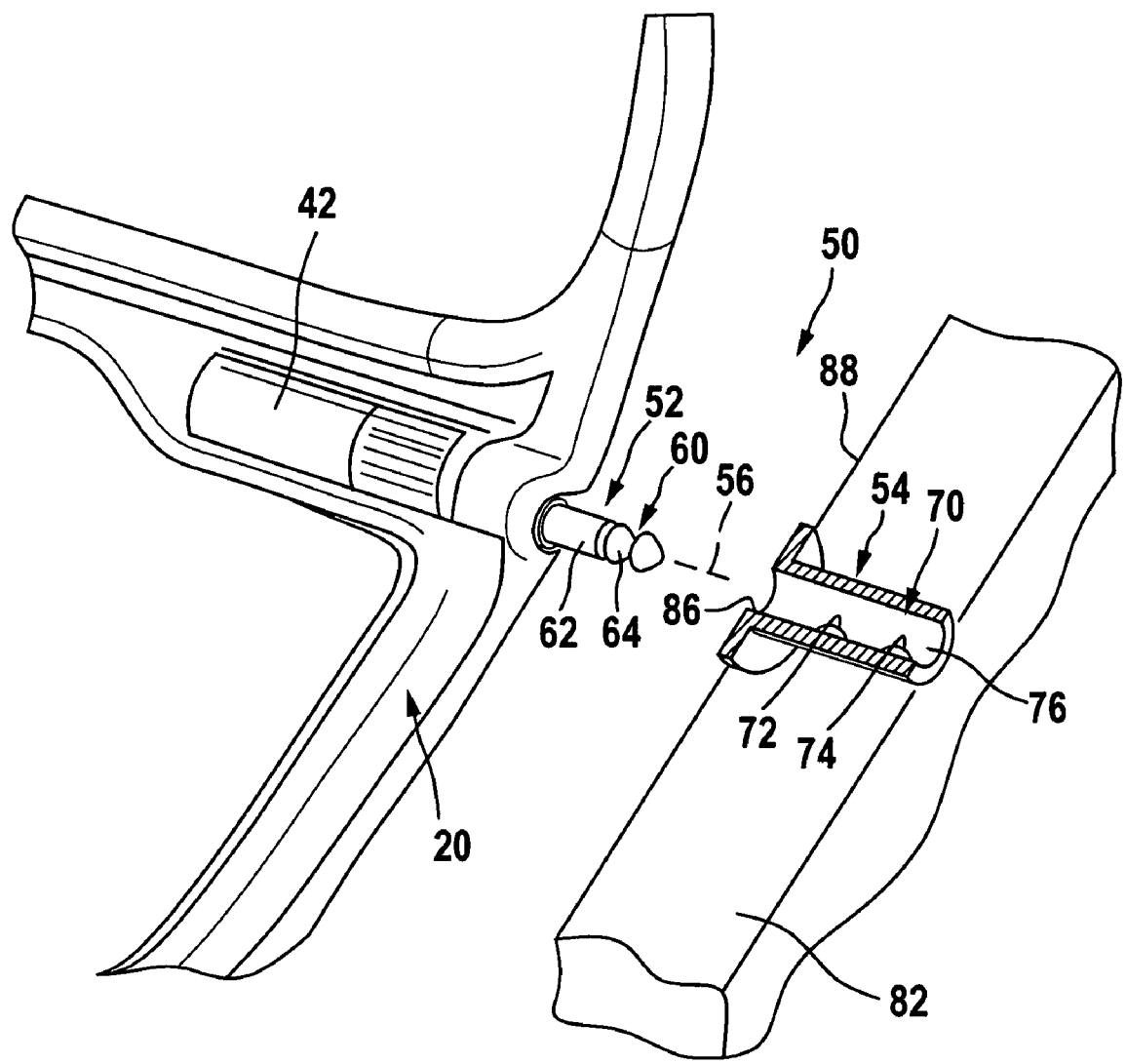
FIG. 3 shows an enlarged illustration of the first exemplary embodiment of the windbreak device according to the invention in the region of a power transmission device.

For example, the first element 52 is in the form of a plug 60 which extends in an insertion direction 56 and has two contact areas 62 and 64 which follow one another in the insertion direction and are formed, for example, by lateral surfaces of the plug 60 and are electrically insulated from one another (FIG. 3).

The plug 60 can be inserted into a plug receptacle 70 in the insertion direction 56, the said plug receptacle having two contacts 72, 74 in an interior space 76, and the said contacts making touching electrical contact with the contact areas 62 and 64 when the plug 60 is inserted into the interior space 76.

This plug receptacle 70 which, for example, forms the second element 54 is connected by means of its contacts 72, 74 to the on-board electrical system 44 of the vehicle body 14 and is therefore able to supply power to the drive device 34 which is disposed in the windbreak base 20 and to the control unit 42.

Since, in the case of the windbreak device according to invention, the windbreak base 20 is disposed level with the beltline 16 of the vehicle body 14 between side walls 82 and 84 of the vehicle body, the plug receptacle 70 which represents the second element 54 is, for example, disposed in the side wall 82, so that its interior space 76 is accessible via an opening 86 which is situated in the region of an inner lining 88 of the side wall 82, the said inner lining facing a passenger space of the vehicle body 14, so that the plug 60 can be inserted into the plug receptacle 70, which is integrated in its entirety in the side wall 82, through this opening 86.

In the first exemplary embodiment, the plug 60 preferably simultaneously forms a fixing pin for mechanically fixing the windbreak base 20 in relation to the vehicle body 14, in particular the side wall 82 of the said vehicle body, and the plug receptacle 70 forms a mechanically correspondingly stable fixing receptacle for the fixing pin.

In order to also supply the control unit 42 of the windbreak base 20 with control signals from a function control means 90 of the cabriolet vehicle 12, in particular a function control means 90 for customary vehicle functions which can also be formed by a plurality of function control units, a signal transmission unit 100 which in the simplest case likewise operates with touching electrical contacts is provided, for example as illustrated in FIG. 2, on that side of the windbreak device 10 which is opposite the power transmission unit 50.

By way of example, the signal transmission unit 100 comprises a first transmission element 102 which is provided on the windbreak base 20, and a second transmission element 104 which is integrated into the side wall 84, the said transmission elements representing a separating point of a control line 106 which leads from the function control means 90 to the control unit 42.

The first transmission element 102 and the second transmission element 104 are preferably likewise in the form of a plug and, respectively, a plug receptacle and are likewise integrated into a fixing element and, respectively, a fixing receptacle for mechanically fixing the windbreak base 20 to the vehicle body 14 between the side walls 82 and 84, so that at the same time the control line 106 between the control unit 42 and the function control means 90 can be closed by contacts touching by virtue of the windbreak base 20 being fixed to the side wall 84.

In the simplest case, the first transmission element 102 is formed and designed in accordance with the plug 60 and the second transmission element 104 is formed and designed in accordance with the plug receptacle 70, but, in this case, the plug 60 is formed such that it can move in relation to the windbreak base 20 in the direction of the insertion direction 56, while the plug 60 of the power transmission device is fixedly connected to the windbreak base 20.

By virtue of the control unit 42 being connected to the function control means 90 of the cabriolet vehicle 12, it is now possible to control the movement of the wind deflector 30 between the inactive position and the active position in accordance with various functional states of the cabriolet vehicle 12.

Figure 4:
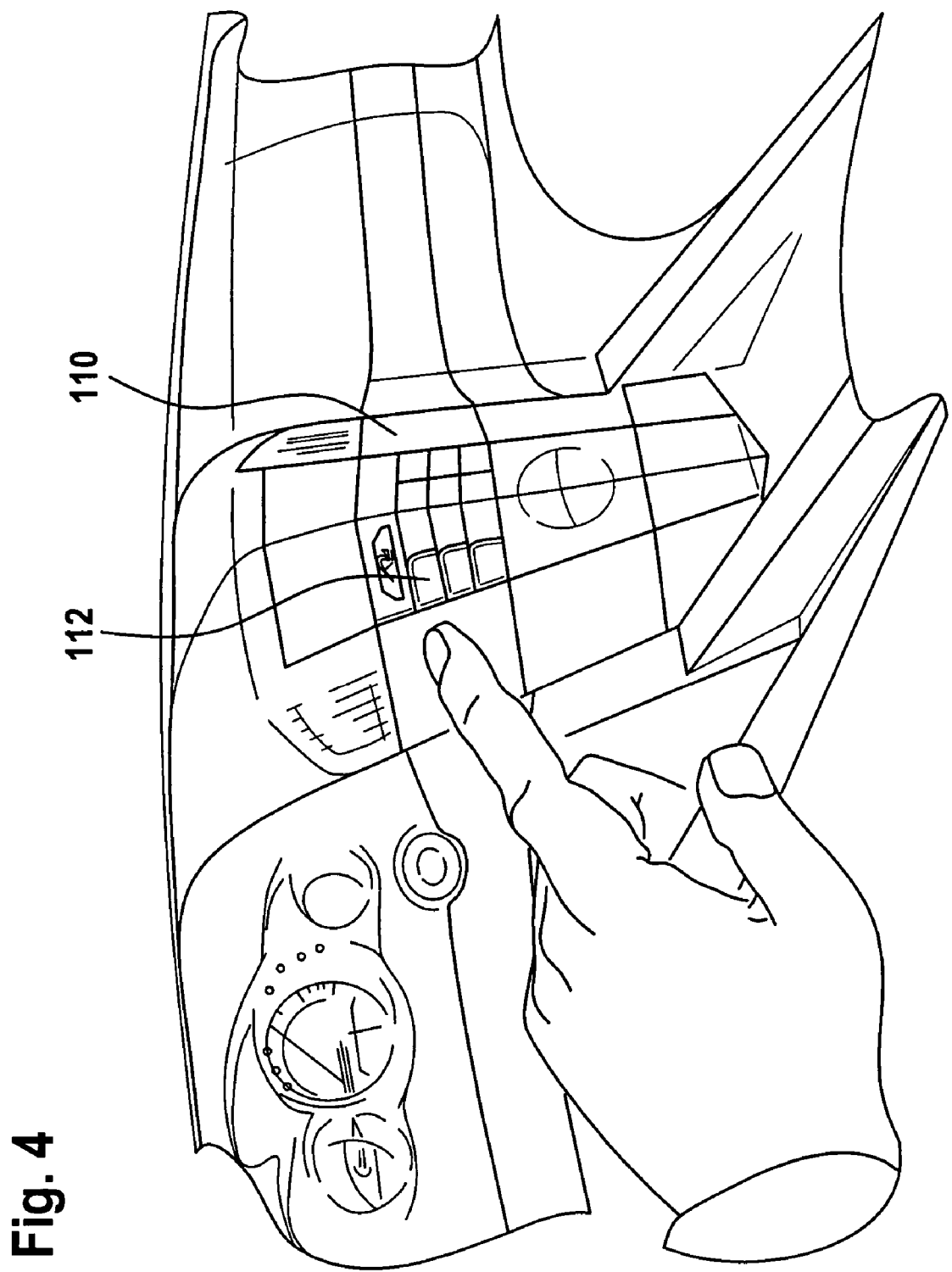
FIG. 4 shows a perspective illustration of a dashboard of the cabriolet vehicle according to FIG. 1 with control keys for moving the wind deflector between the active and the inactive position.

By way of example, as illustrated in FIG. 4, it is possible to provide control keys 112 on a dashboard 110 of the cabriolet vehicle 12, it being possible for operation of the said control keys to be identified using the function control means 90 and to be transmitted to the control unit 42 in the form of a control signal.

It is also possible to use the function control means 90 to detect a traveling speed of the cabriolet vehicle 12 and, when a specific predefined speed is exceeded, for the function control means 90 to transmit to the control unit 42 the signal that the wind deflector 30 is to be moved from the inactive position to the active position.

Figure 5:
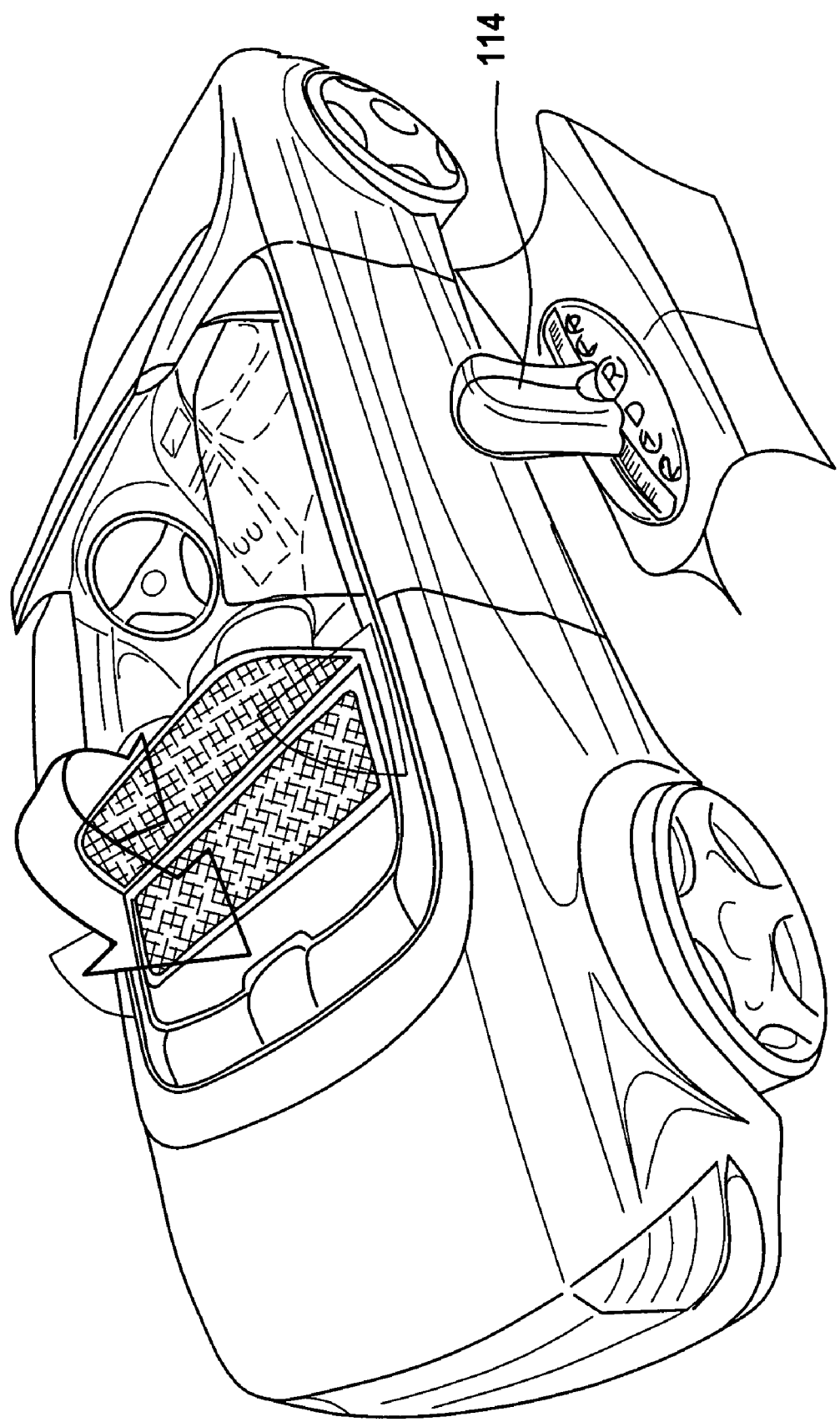
FIG. 5 shows a schematic illustration similar to FIG. 1 with the additional illustration of a gear selector lever.

Furthermore, as illustrated in FIG. 5, it is possible to detect a position of a gear selector lever 114, and to move the wind deflector 30 from the active position to the inactive position, for example when a reverse gear is engaged by means of the gear selector lever 114, in order to ensure that a driver has an optimum view when driving backward, without being impeded by the wind deflector 30.

Figure 6:
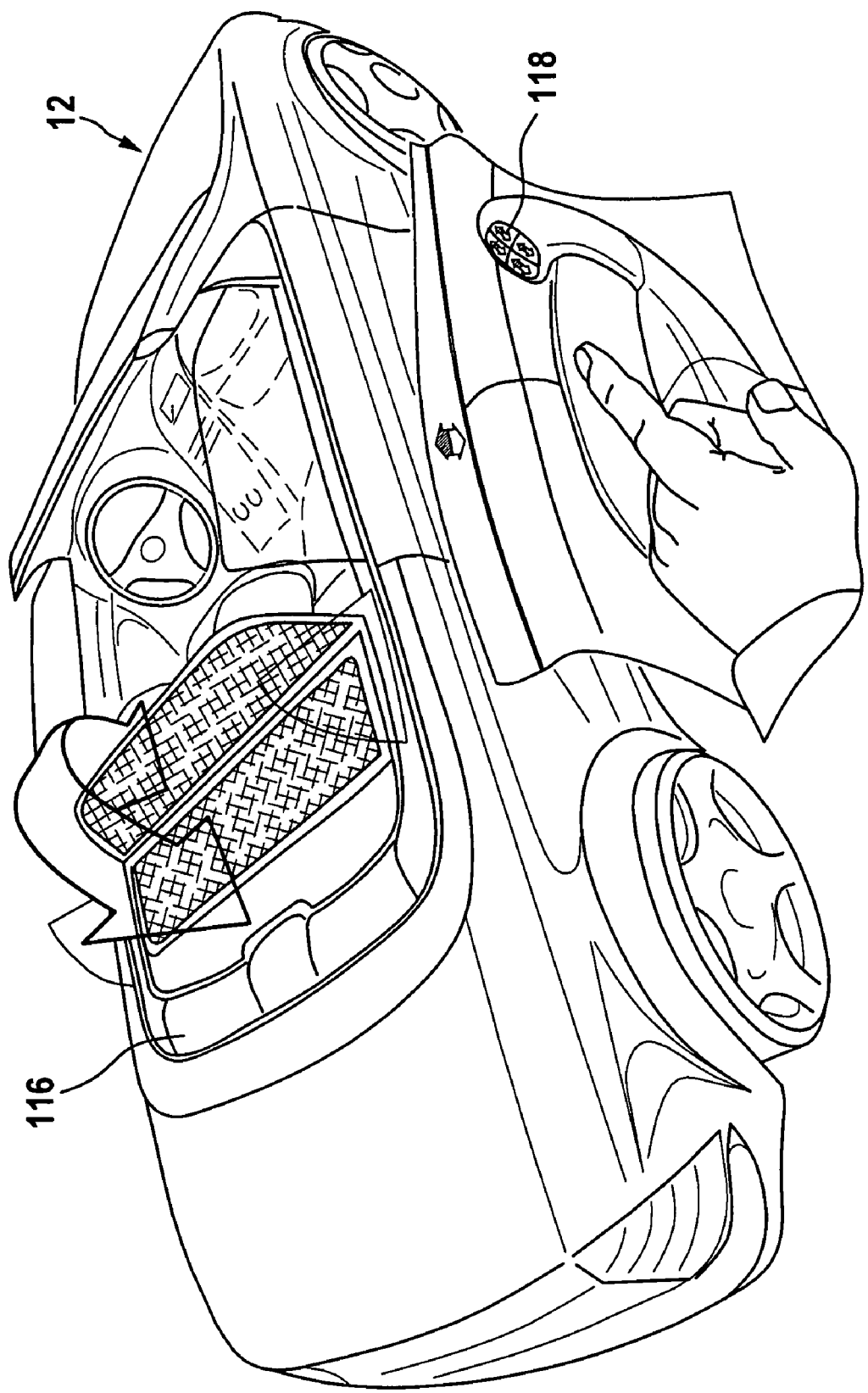
FIG. 6 shows a schematic illustration similar to FIG. 1 with the additional illustration of an operating element for a window control system.

It is also possible, as illustrated in FIG. 6, to detect a position of a top 116 of the cabriolet vehicle 12 and to control the wind deflector 30 in accordance with the position of the top 116, for example to move the wind deflector 30 from the active to the inactive position when the top is closed or to move the wind deflector 30 from the inactive position to the active position when the top 116 is open, that is to say when the top 116 is in the fully opened state, for example.

It is additionally possible, as likewise illustrated in FIG. 6, to check control keys 118 of a window control means and, when a signal is given to raise all the windows of the cabriolet vehicle 12 for example, to transmit from the function control means 90 to the control unit 42 the instruction that the wind deflector 30 is to be moved from its inactive position to its active position in this case too, the windows always being raised when traveling at relatively high speeds in order to suppress the occurrence of drafts in the region of the front row 18 of seats, so that it is also expedient to move the wind deflector 30 from the inactive position to the active position in this driving state too, since this prevents the occurrence of drafts from air turbulence which forms, during driving, in the region of the rear.

Figure 7:
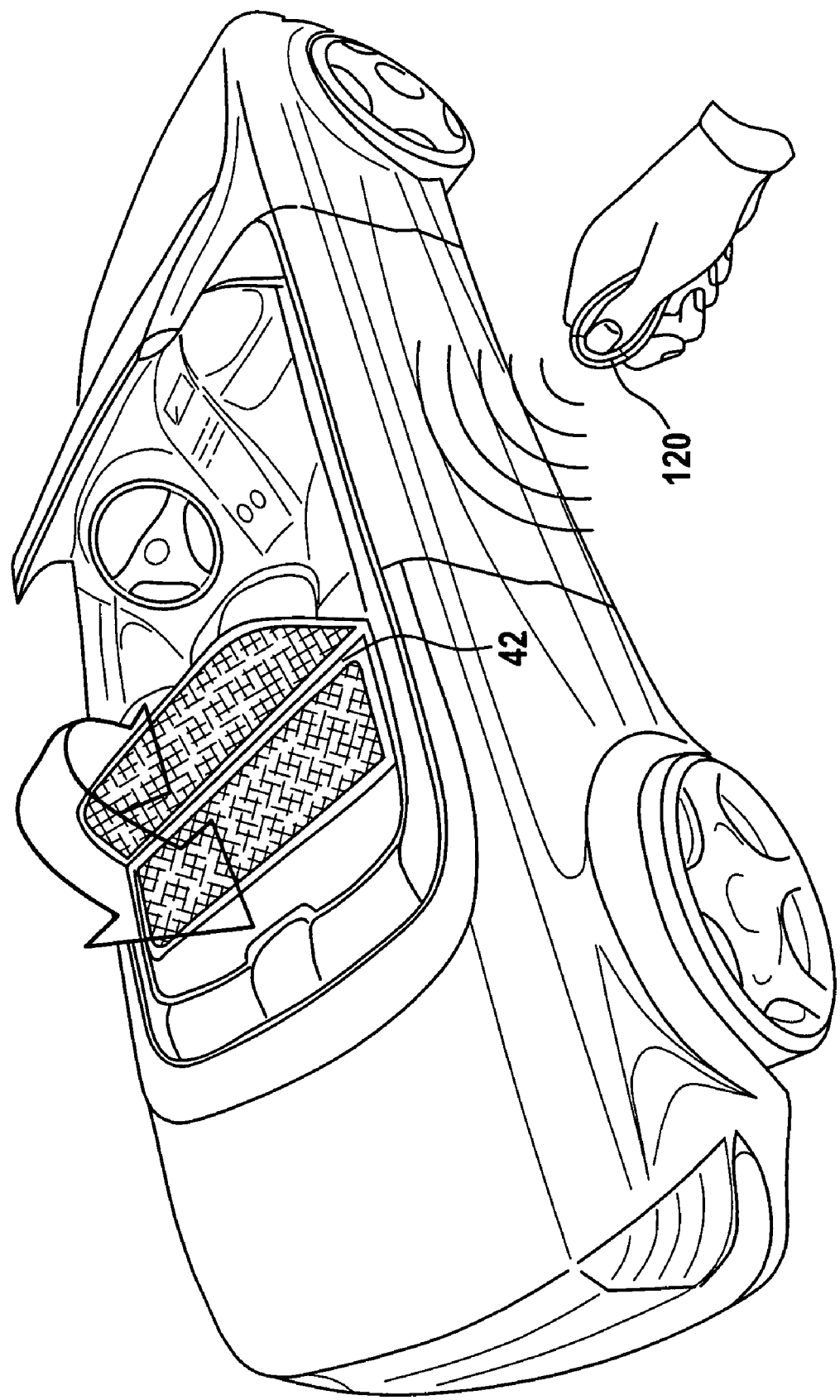
FIG. 7 shows a schematic illustration similar to FIG. 1 with a manual operator control means for moving the wind deflector between the inactive and the active position.

In the first exemplary embodiment, provision is further made, as illustrated in FIG. 7, for the control unit 42 to communicate with a portable manual operator control means 120 in a wire-free fashion, so that it is likewise possible to move the wind deflector 30 to and fro between the active position and the inactive position using the manual operator control means 120.

Figure 8:
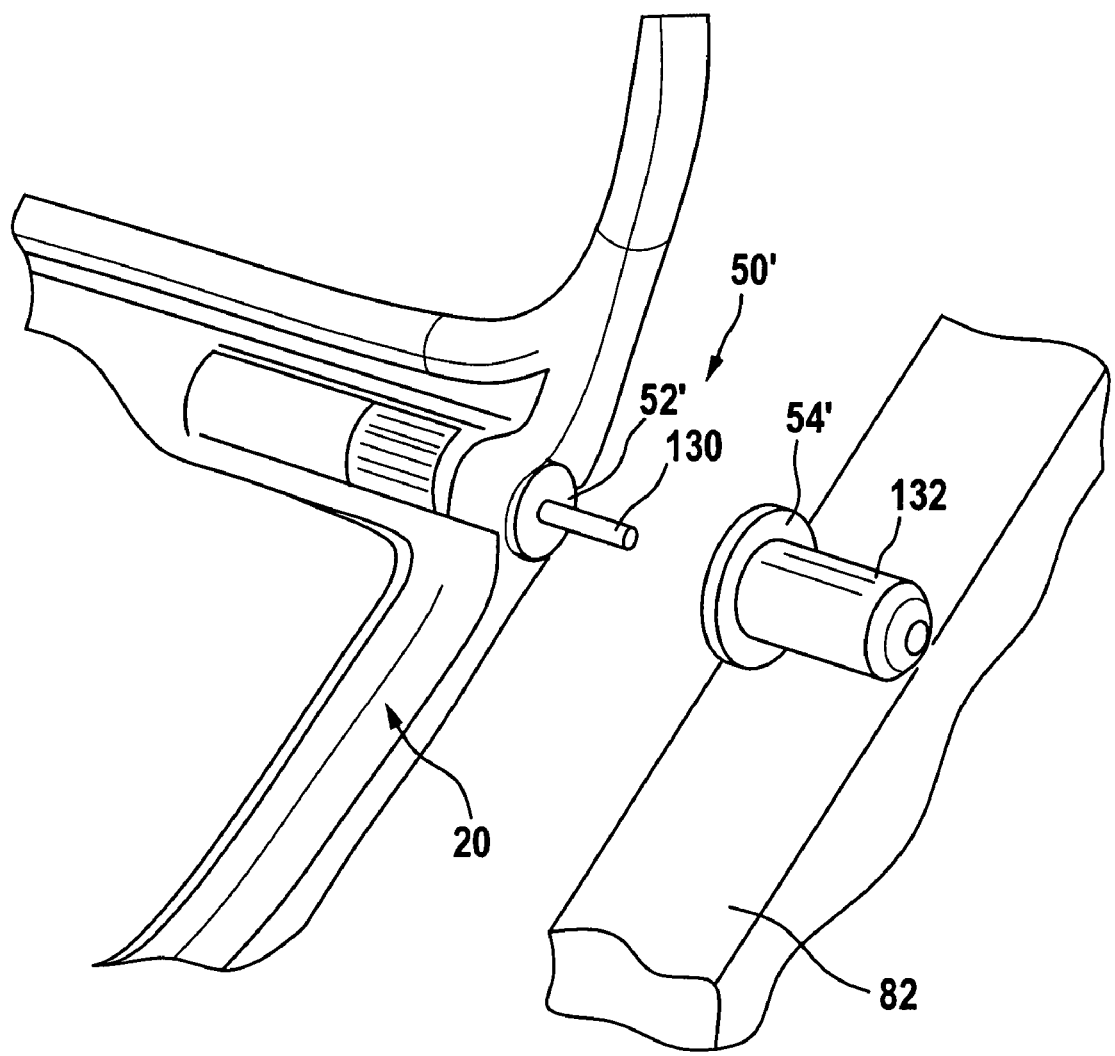
FIG. 8 shows a schematic illustration similar to FIG. 3 of a second exemplary embodiment of a windbreak device according to the invention.

In a second exemplary embodiment of a windbreak device according to the invention, as illustrated in FIG. 8, those parts which are identical to those of the first exemplary embodiment are provided with the same reference symbols, so that reference is made in full to the statements made about the first exemplary embodiment with regard to the description of the said parts.

However, in contrast to the first exemplary embodiment, the power transmission device 50' is in the form of a power transmission device which operates in a contact-free fashion, the first element 52', which is disposed on the windbreak base 20, and the second element 54', which is integrated into the side wall 82, interacting in a contact-free fashion.

By way of example, inductive coupling is effected between the second element 54' and the first element 52' and power is therefore transmitted from the on-board electrical system 44 of the cabriolet vehicle 12 to the windbreak base 20 by means of induction.

The windbreak base 20 is fixed in a conventional manner by means of a mechanical socket pin 130 which can be inserted into a socket pin receptacle 132, it preferably being possible for the elements 52' and 54' to be disposed coaxially in relation to the socket pin 130.

Figure 9:
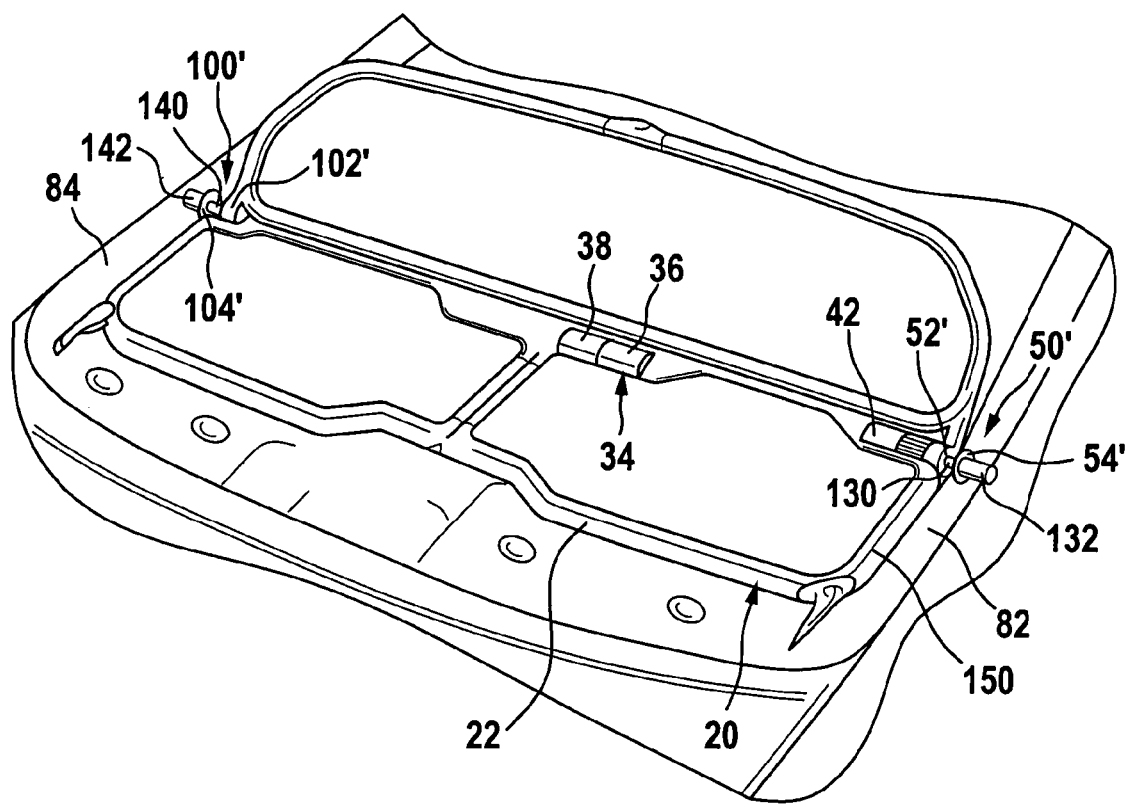
FIG. 9 shows a schematic illustration similar to FIG. 2 of the second exemplary embodiment of the windbreak device according to the invention.

In the same way as in the first exemplary embodiment, the windbreak device can additionally (FIG. 9) be fixed to the vehicle body 14 on the opposite side of the windbreak base 20 likewise by means of a socket pin 140 which can be inserted into a socket pin receptacle 142, the two socket pin receptacles 132 and 142 being integrated into the respective side walls 82 and 84.

In the same way, the second element 54 is also integrated into the side wall 82, preferably such that the said second element is disposed on a side of the side wall 82 which faces the windbreak base 20, preferably in the region of the inner lining 88.

In order to be able to simultaneously transmit control signals from the function control means 90 to the control unit 42, the first transmission element 102' and the second transmission element 104' of the signal transmission unit 100', which transmission elements preferably likewise interact with one another in a contact-free fashion, are provided in the region of the socket pin 140 and the socket pin receptacle 142 in the second exemplary embodiment.

As an alternative to inductive interaction between the first transmission element 102' and the second transmission element 104', it is likewise feasible to provide optical transmission of control signals, for example by infrared means.

Otherwise, the second exemplary embodiment operates in the same way as the first exemplary embodiment, so that reference can be made in full to the statements made about the first exemplary embodiment with regard to the description of the individual functions and interaction, in particular with the function control means 90.

However, in the second exemplary embodiment it is not absolutely necessary to dispose the power transmission device 50' with the first element 52' and the second element 54' coaxially with respect to the socket pin 130. It is equally possible to dispose the power transmission device 50' with the first element 52' and the second element 54' eccentrically with respect to the socket pin 130, for example at any desired point of a covering frame 150 of the cover 22, insofar as the said covering frame runs parallel to an element of the vehicle body 14, for example one of the side walls 82, 84.

In the same way, the signal transmission unit 100' with the first transmission element 102' can also be disposed at any desired point of the covering frame 150, insofar as the said covering frame runs parallel to an element of the vehicle body 14, for example one of the side walls 82, 84, the corresponding second transmission element 104 then being disposed in the respective region of the vehicle body, for example the side walls 82, 84, which adjoins the covering frame 150.

The invention claimed is:

1. Windbreak device for cabriolet motor vehicles, comprising:
    a windbreak base adapted to be fixed to a body of a motor vehicle by a fixing device, said fixing device comprising a first fixing element disposed on the windbreak base and a second fixing element arranged on a sidewall of the body of the motor vehicle, the first and the second fixing elements adapted to be connected in order to fix the windbreak device to the body of the motor vehicle,
    a wind deflector which extends in a wind deflector surface mounted on the windbreak base and adapted to move between an active position and an inactive position, and a drive device disposed on the windbreak base for moving the wind deflector between the inactive and the active position and vice versa, the drive device being adapted to be supplied with power from an on-board electrical system of the motor vehicle by means of a power transmission device, the power transmission device comprising a first power transmission element which is disposed on the windbreak base, and a second power transmission element which is disposed on the side wall of the body of the motor vehicle, the first power transmission element being arranged on the first fixing element and the second power transmission element being arranged on the second fixing element, the first and second power transmission elements transferring power from the on-board electrical system of the motor vehicle to the drive device when the windbreak device is fixed to the motor vehicle in a functional position with the first fixing element connected to the second fixing element.

2. Windbreak device according to claim 1, wherein the first fixing element is disposed such that it is integrated in the windbreak base.

3. Windbreak device according to claim 1, wherein the second fixing element is disposed such that it is integrated in the side wall of the motor vehicle body.

4. Windbreak device according to claim 1, wherein the first and the second power transmission elements of the power transmission device transmit electrical power via touching electrical contact areas.

5. Windbreak device according to claim 4, wherein the first and the second power transmission elements are in a form of plug contact elements.

6. Windbreak device according to claim 1, wherein the first and the second power transmission elements of the power transmission device transmit electrical power in a contact-free fashion.

7. Windbreak device for cabriolet motor vehicles, comprising:

a windbreak base adapted to be fixed to a body of the motor vehicle by a fixing device, said fixing device comprising a first fixing element disposed on the windbreak base and a second fixing element arranged on a sidewall of the body of the motor vehicle, the first and the second fixing elements adapted to be connected in order to fix the windbreak device to the body of the motor vehicle, a wind deflector which extends in a wind deflector surface mounted on the windbreak base and adapted to move between an active position and an inactive position, a drive device for moving the wind deflector between the inactive and the active position and vice versa, a control unit associated with the drive device, the control unit being adapted to actuate the drive device to move the wind deflector between the inactive position and the active position and vice versa, the control unit being adapted to communicate with a function control means on the motor vehicle, and a signal transmission unit comprising a first signal transmission element disposed on the windbreak base and a second signal transmission element disposed on the side wall of the body of the motor vehicle, the first and second signal transmission elements transferring control signals from the functional control means on the motor vehicle to the control unit when the windbreak device is fixed to the motor vehicle in a functional position with the first fixing element connected to the second fixing element.

8. Windbreak device according to claim 7, wherein the first signal transmission element is integrated into the windbreak base.

9. Windbreak device according to claim 7, wherein the second signal transmission element is integrated into the side wall of the vehicle body.

10. Windbreak device according to claim 7, wherein the signal transmission elements interact with one another via touching electrical contact areas.

11. Windbreak device according to claim 7, wherein the signal transmission elements interact with one another in a contact-free fashion.

12. Windbreak device according to claim 11, wherein the signal transmission elements interact with one another in an inductive fashion.

13. Windbreak device according to claim 11, wherein the signal transmission elements interact with one another in an optical fashion.

14. Windbreak device according to claim 7, wherein the control unit communicates with a portable manual operator control means.

15. Windbreak device according to claim 14, wherein the manual operator control means and the control unit communicate in a contact-free fashion.

16. Windbreak device according to claim 14, wherein the control unit communicates with the manual operator control means via the function control means on the motor vehicle.

17. Windbreak device according to claim 16, wherein the function control means communicates with the portable manual operator control means in a contact-free fashion.

18. Windbreak device according to claim 16, wherein individual function modes of the function control means can be activated and deactivated.

19. Windbreak device according to claim 7, wherein the function control means initiates movement of the wind deflector from the inactive position to the active position via the control unit when the motor vehicle exceeds a predefinable speed.

20. Windbreak device according to claim 7, wherein the function control means initiates movement of the wind deflector from the inactive to the active position via the control unit when a top of the motor vehicle is opened.

21. Windbreak device according to claim 7, wherein the function control means initiates movement of the wind deflector from the active position to the inactive position via the control unit when a reverse gear is engaged.

22. Windbreak device according to claim 7, wherein the function control means initiates movement of the wind deflector from the inactive position to the active position via the control unit when all the windows of the motor vehicle are raised.

23. Windbreak device according to claim 7, wherein the function control means initiates movement of the wind deflector between the inactive position and the active position, or vice versa, via the control unit when a corresponding control key in the motor vehicle is operated.

24. Cabriolet vehicle, comprising:

a windbreak device, said windbreak device comprising:

a windbreak base adapted to be fixed to a body of a motor vehicle by a fixing device, said fixing device comprising a first fixing element disposed on the windbreak base and a second fixing element arranged on a sidewall of the body of the motor vehicle, the first and the second fixing elements adapted to be connected in order to fix the windbreak device to the body of the motor vehicle, a wind deflector which extends in a wind deflector surface mounted on the windbreak base and adapted to move between an active position and an inactive position, and a drive device disposed on the windbreak base for moving the wind deflector between the inactive and the active position and vice versa, the drive device being adapted to be supplied with power from an on-board electrical system of the motor vehicle by means of a power transmission device, the power transmission device comprising a first power transmission element which is disposed on the windbreak base, and a second power transmission element which is disposed on the side wall of the body of the motor vehicle, the first power transmission element being arranged on the first fixing element and the second power transmission element being arranged on the second fixing element, the first and second power transmission elements transferring power from the on-board electrical system of the motor vehicle to the drive device when the windbreak device is fixed to the motor vehicle in a functional position with the first fixing element connected to the second fixing element.

* * * * *